United States Patent [19]
Ando et al.

[11] Patent Number: 6,105,249
[45] Date of Patent: Aug. 22, 2000

[54] PROCESS FOR PRODUCING AN ELECTROGRAPHICS ROLLER

[75] Inventors: Yukio Ando, Yokohama; Hajime Hasegawa, Chigasaki; Shigeo Kuriyama; Yosuke Noda, both of Yokohama, all of Japan

[73] Assignee: Bridgestone Corporation, Tokyo, Japan

[21] Appl. No.: 09/226,000

[22] Filed: Jan. 7, 1999

Related U.S. Application Data

[62] Division of application No. 08/899,648, Jul. 24, 1997, Pat. No. 5,893,821.

[30] Foreign Application Priority Data

Aug. 2, 1996 [JP] Japan .................................. 8-220429

[51] Int. Cl.$^7$ .................................................. B21D 53/00
[52] U.S. Cl. .................................. 29/895; 492/57; 492/59
[58] Field of Search .................................. 492/39, 57, 59; 29/895

[56] References Cited

U.S. PATENT DOCUMENTS 3,229,352   1/1966   Balkin et al. ............................ 492/59

*Primary Examiner*—Irene Cuda
*Attorney, Agent, or Firm*—Oblon, Spivak, McClelland, Maier & Neustadt, P.C.

[57] ABSTRACT

A roller is equipped with an elastic layer comprising a foam, wherein at least a part of the elastic layer is subjected to permanent compressional deformation by heating compression, and the cells in the elastic layer subjected to permanent compressional deformation by heating compression outnumber the cells therein before the heating compression; and a process for producing the above roller in high efficiency. The above process enables the production of the roller in which the surface state of only an arbitrary portion thereof is modified according to the purpose of use, and the roller thus obtained can exhibit high performances in a variety of applications including paper feed roller, developer conveying roller and so forth.

6 Claims, 4 Drawing Sheets

PROCESS FOR PRODUCING AN ELECTROGRAPHICS ROLLER

This is a division of Ser. No. 08/899,648 filed Jul. 24, 1997, now U.S. Pat. No. 5,893,821.

BACKGROUND OF THE INVENTION

1. Field of the Invention

The present invention relates to a roller and a process for producing the same. More particularly, it pertains to a roller such as a developer conveying roller (also referred to as "developer feed roller"), electrifying roller, transfer roller, developing roller, cleaning roller and paper feed roller each to be used in an electrophotographic apparatus or electrostatic recording apparatus such as a copying machine and printer; and to a process for producing said roller.

2. Description of Related Arts

An electrophotography recording apparatus which is widely utilized for a copying machine, a laser beam printer and the like is equipped generally with a photosensitive body in the form of a drum (herenafter referred to as "photosensitive drum") and functions so as to form an electrostatic latent image by carrying out electrification and exposure against said photosensitive drum; then allow a developer such as a toner (hereinafter sometimes referred to as "toner") to adhere to the photosensitive drum in accordance with the latent image on the drum to proceed with development; subsequently transfer the toner on the drum to a recording medium such as a recording sheet for the purpose of image transfer; thereafter electrically discharge the drum to a prescribed potential and clean the toner remaining on the drum; and then prepare the recording. The toner carried on the recording medium by means of image transfer is fixed onto the recording medium by being molten and pressure stuck, thus completing a series of recording work.

In the following, simple description will be given of the conveyance of the developer in the aforesaid series of recording work. Specifically, for example, a developer which is filled in a developing apparatus is fed to the surfaces of a developing roller by means of a developer conveying roller (developer feed roller) and is regulated to a uniform thin layer by a blade. While the developing roller is rotated in contact with or in close proximity to a photosensitive drum under the above-mentioned developer condition, the developer is stuck to the electrostatic latent image on the drum from the developing roller to visualize said latent image.

With recent progress of electrophotographical technique, a variety of requisite characteristics come to be imposed upon a roller such as a developer conveying roller, electrifying roller, transfer roller, developing roller, cleaning roller and paper feed roller each being used in an electrophotography recording apparatus. One of the aforesaid requisite characteristics is that an alteration be made in the surface conditions of only an arbitrary part of a roller.

The reason for such requisite characteristics being demanded varies depending upon the type of a roller as described hereunder. In the case of an electrifying roller, transfer roller, developing roller and cleaning roller, there have been a problem in which since the roller is rotated in contact with a photosensitive drum, the frictional force between the roller and the drum, when being excessively strong, results in a large-sized electric motor for driving the roller, the need for replacing the existing electric power source with a power source having a larger capacity.

On the other hand, in the case of a paper feed roller, whose general structural drawing is given in FIG. 3, a shaft 21 is equipped with ring bodies 22 made of a synthetic resin, over which are fitted rubbery elastic layers 23. Such a paper feed roller in which a shaft 21 is equipped in advance, with a plurality of elastic layers 23 is directed to the prevention of meandering of a recording medium which feeds sheets of paper. However, a paper feed roller of such a structure has involved the problems of intricate and large number of production steps and consequent high production cost.

In addition, the developer conveying roller is called upon (1) to make an elastic layer low in hardness, smoothen its surface, secure a nip between the developer conveying roller and the developing roller and ensure a sufficient amount of a developer to be conveyed; (2) to enhance the density of cells on and around the surface of the developer conveying roller so as to prevent the surface thereof from being clogged with the developer; and (3) to eliminate scuffing on the surface of the developer conveying roller and prevent foreign matters such as a foam and cellular material from mixing in a developing apparatus.

Under such circumstances, various methods have been developed for the purpose of producing a developer conveying roller which satisfies the requisite characteristics in the preceding items (1) through (3). The above-developed methods, however, have both advantages and disadvantages, thus failing to readily produce a developer conveying roller which simultaneously satisfies all the aforestated requisite characteristics.

SUMMARY OF THE INVENTION

In such circumstances, intensive research and investigation were made by the present inventors on a roller and a process for procuing the same involving such problems. As a result, it has been found that a roller is readily improved in its surface state at a low cost by heating compressing a part of an elastic layer comprising a foam for a roller having said elastic layer, and in particular, that the number of cells in a part of the elastic layer can be made more than the number thereof prior to the heating compression. The present invention has been accomplished by the foregoing finding and information.

It is an object of the invention to provide a roller whose surface condition of only an arbitrary part is altered in an inexpensive and simple manner.

It is another object of the invention to provide a smooth and scuffing-free roller having an elastic layer of low hardness and of a high density of cells on the surface.

The first aspect of the present invention relates to a roller equipped with an elastic layer compriseing a foam, at least a part of said elastic layer being subjected to permanent compressional deformation by heating compression. It is desirable in this case, that the cells in the elastic layer subjected to permanent compressional deformation be made to outnumber the cells in said elastic layer prior to the heating compression. It is desirable as the case may be, that a skin be formed on the surface of the elastic layer.

The second aspect of the present invention is concerned with a process for producing a roller equipped with an elastic layer comprising a foam which process comprises subjecting at least a part of said elastic layer to permanent compressional deformation by heating compression. It is also desirable in this case that the cells in the elastic layer be made to outnumber the cells in said elastic layer prior to the heating compression by heating compressing said elastic layer. It is desirable as the case may be, to heat and compress the elastic layer so that the surface of said elastic layer is molten to form a skin.

DESCRIPTION OF PREFERRED EMBODIMENTS

Figure 1A:
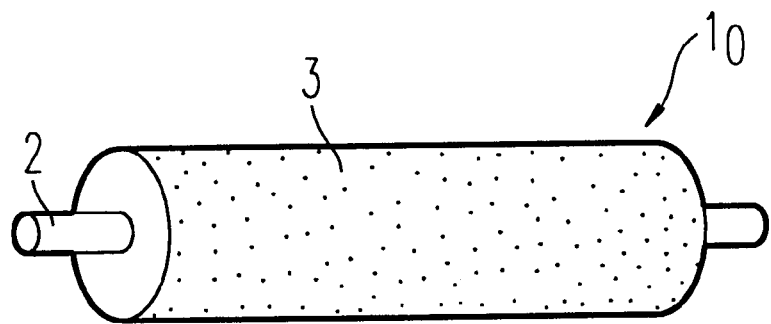
FIG. 1 is a shematic illustration for the explanation of a process for producing a paper feed roller relating to the present invention.

It is necessary in the roller of the present invention only that at least a part of an elastic layer be subjected to permanent compressional deformation by heating compression. It is desirable in particular, that the cells in the elastic layer be made to outnumber the cells in said elastic layer prior to the heating compression by heating compressing said elastic layer. Specifically, it is desirable that the number of cells in the elastic layer subjected to permanent compressional deformation be selected in the range of 1.05 to 5.00 times, especially 1.05 to 3.00 times the number of cells therein prior to the heating compression. The above factor, when exceeding 5.00, results in a high compression ratio and a high hardness of the roller as a whole, thereby sometimes failing to obtain the objective roller. By the term "the number of cells in the elastic layer subjected to permanent compressional deformation" as mentioned herein is meant the number of cells obtained by measuring the number of cells from the surface of the elastic layer to a depth of 1 mm therefrom irrespective of the outside diameter of the roller.

The surfacial state of the roller can be suitably varied according to the heating compressing conditions. For example, the elastic layer, when subjected to heating compression until its permanent compressional deformation, partially undergoes permanent compressional deformation, which leads to high hardness. On the other hand, the elastic layer, when subjected to heating compression until the surface thereof is molten to form a skin, can partially be formed into a skin.

Preferable materials of construction for the elastic layer of the roller according to the present invention are not specifically limited, but are exemplified by a thermoplastic foam such as polyethylene, polyvinyl chloride, polystyrene, polyvinyl alcohol, viscose rayon, ionomer and polyurethane and a thermosetting foam made from such materials as polyurethane, rubber, epoxy resin, phenol/urea resin, polyester resin, silicone resin and acrylic resin. Of these polyurethane foam is particularly preferable.

The form of cells in the elastic layer may be any of closed cell and intercommunicating cell for the purpose of use, of which the intercommunicating cell is preferable because of less dimensional variation with temperature.

In the case where the material of construction for the elastic layer is a flexible polyurethane foam, a usable polyol as a starting material therefor is not specifically limited, but may be any type of polyol whether it is hydrophobic or hydrophilic. In the case of a developer conveying roller, it is preferably polyester polyol or polyether polyol from the viewpoint of fusion adhesivity of a toner. Likewise, a usable isocyanate as another starting material is not specifically limited, but may be any publicly known type.

The heating compressing conditions are not specifically limited but may be suitably altered according to the material of the elastic layer. In the case of flexible polyurethane foam, for example, the heating compressing conditions depend upon the softening point thereof, but are preferably 120 to 220° C. and 0.5 to 20 minutes, approximately at the time of permanent compressional deformation. By the treatment under such conditions, the foam containing so-called cell is subjected to permanent compressional deformation, or a thin skin layer is formed on the surface thereof.

It is also possible to impart various properties to the elastic layer of the roller. Examples of elctroconductive materials for imparting electroconductivity thereto include electroconductive carbon such as Ketjen black EC and acetylene black; carbon for rubber such as SAF (Super abrasion furnace), ISAF (Intermediate super abrasion furnace), HAF (High abrasion furnace), FEF (Fast extrusion furnace), GPF (General purpose furnace), SRF (Semi-reinforcing furnace), FT (Fine thermal) and MT (Medium thermal); oxidizingly treated carbon for color (ink); thermally cracked carbon; natural graphite; artificial graphite; antimony-doped tin oxide; titanium oxide; zinc oxide; oxides of metal such as nickel, copper, silver and germanium; and electroconductive polymer such as polyaniline, polypyrrole and polyacetylene. Of these, the electroconductive material which is inexpensive and easy to control electroconductivity with a small amount is a carbon black. The electroconductive material is suitably used in a blending amount in the range of usually 0.5 to 50 parts by weight, especially 1 to 30 parts by weight based on 100 parts by weight of the elastic layer material.

In addition, examples of ionically electroconductive substances include inorganic ionically electroconductive substance such as sodium perchlorate, lithium perchlorate, calcium perchlorate and lithium chloride; and organic ionically elctroconductive substance or charge transfer complex such as perchlorates, sulfates, ethosulfates, methylsulfates, phosphates, borofluorides, acetates, etc. each of quaternary ammonium that are exemplified by tridecylmethyldihydroxyethylammonium perchlorate, lauryltrimethylammonium perchlorate, modified aliphatic dimethylethylammonium ethosulfate, N,N-bis(2-hydroxyethyl)-N-(3'-dodecyloxy-2'-hydroxypropyl)methylammonium ethosulfate, 3-laurylamidepropyl-trimethylammonium methylsulfate, stearylamidepropyldimethyl-hydroxyethylammonium dihydrogenephosphate, tetrabutylammonium borofluoride, stearylammonium acetate and laurylammonium acetate. The above-mentioned electroconductive material is suitably used in a blending amount in the range of usually 0.0001 to 50 parts by weight based on 100 parts by weight of the elastic layer material.

The material of construction for the shaft of the roller according to the present invention is not specifically limited, but is exemplified by a metal and resin. A resin shaft may be imparted with electroconductivity according to its purpose of use. Moreover, the surfaces of the elastic layer for the roller of the present invention may be imparted with a coating, and in this case, the coating may be imparted, as necessary, with electroconductivity by adding thereto the above-exemplified electroconductive material.

In the process for producing a roller according to the present invention there are available various methods for heating compressing the elastic layer without specific limitation, which methods are exemplified by (1) a method in which a heated mold is pushed and pressed against the roller equipped with an elastic layer; (2) a method in which a mold is pushed and pressed against the roller equipped with an elastic layer, followed by heating the mold; and (3) a method in which the roller equipped with an elastic layer is press fitted into a cylindrical member, at least a part of said elastic layer is compressed and thereafter said cylindrical member is heated.

In the following, some description will be given, by way of an example, of the process for producing a paper feed roller relating to the present invention.

Figure 1B:
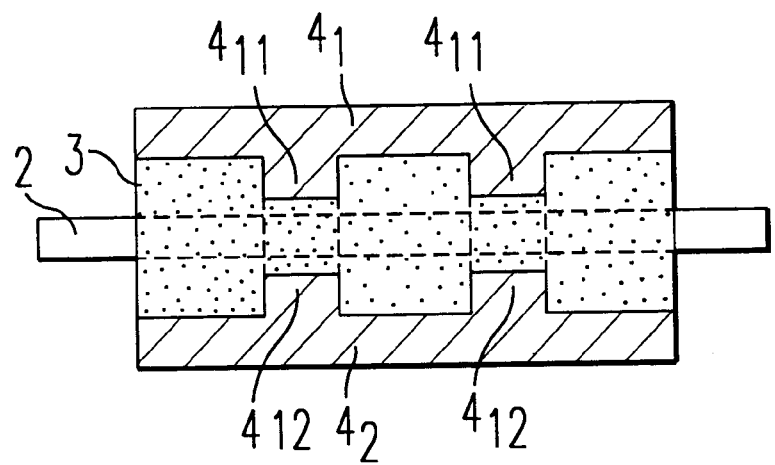
Figure 2:
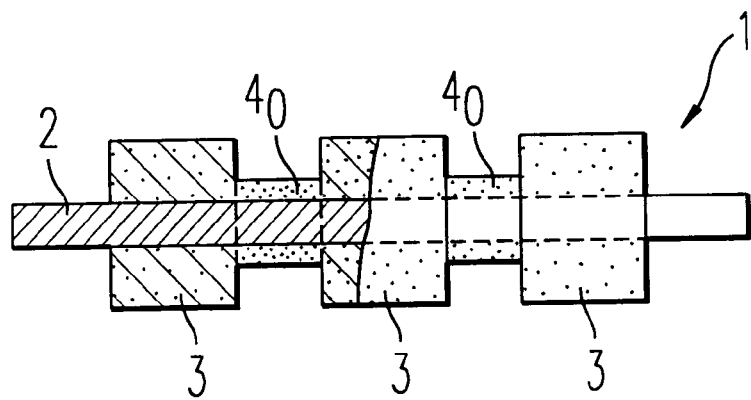
FIG. 2 is a partially cross-sectional side view showing the paper feed roller relating to the present invention.
Figure 3:
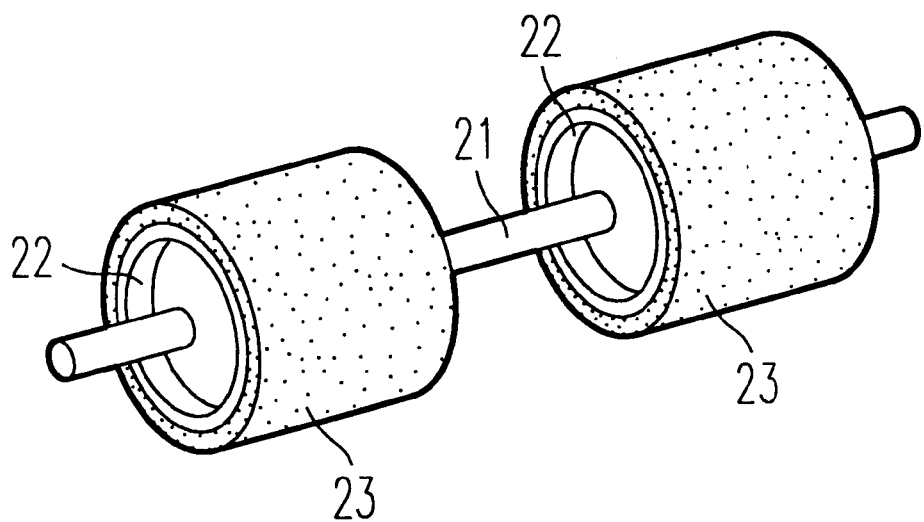
FIG. 3 is a perspective view showing a conventional paper feed roller.
Figure 4A:
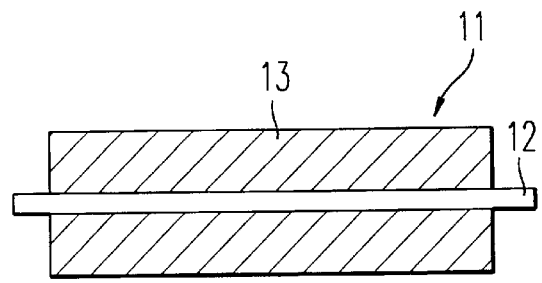
FIG. 4 is a schematic illustration showing one example of process for producing a paper feed roller according to the present invention.
Figure 4B:
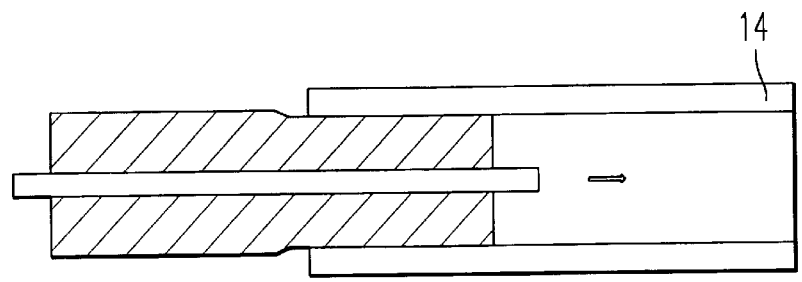
Figure 4C:
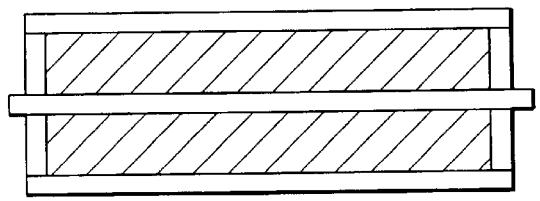
Figure 4D:
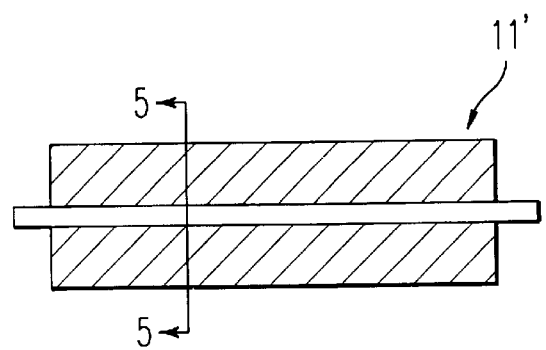

FIG. 1 is a shcematic illustration for the explanation of a process for producing a paper feed roller relating to the present invention and FIG. 2 is a partially cross-sectional side view showing the paper feed roller obtained by the aforesaid process, wherein symbol 1 is a paper feed roller, symbol 2 is a shaft, symbols 3, 3$_1$ and 3$_2$ are each an elastic layer and symblos 4$_1$ and 4$_2$ are each a mold.

In a first step (FIG. 1 (*a*)), a shaft 2 is covered with an elastic layer on the outer periphery thereof to constitute a base body 1$_0$ of the paper feed roller. In this example, the elastic layer 3 is made of a flexible polyurethane foam having the number of cells of 65/inch, in which the cell membranes have been treated by an explosion method to form intercommunicating cells. An adhesive layer may be placed, if necessary, between the shaft 2 and the elastic layer 3 (not shown on the drawing). The exemplary elastic layer 3 which has been made into a cylindrical form in advance, may be replaced as the case may be, with an elastic layer in the form of a polygon cut out from a foam block.

In a second step (FIG. 1 (*b*)), arbitrary portions, in the longitudinal direction of the shaft 2, of the elastic layer 3 for the base body 1$_0$ of the paper feed roller is heat compressed with the molds 4$_1$, 4$_2$, that are equipped with protrusions 4$_{11}$, 4$_{12}$ at opposing positions. The base body 1$_0$ of the paper feed roller is inserted between the molds and heat compressed under the conditions of 140° C. for 5 minutes to subject the elastic layer 3 to permanent compressional deformation.

Through the above-mentioned processing steps, there is obtained the paper feed roller 1, in which the elastic layer 3 is imparted with depressions 4$_0$ which correspond to the protrusions 4$_{11}$, 4$_{12}$ and are subjected to permanent compressional deformation. The number of cells on and around the surface of the depressions 4$_0$ of the elastic layer 3 for the paper feed roller after heating compression is about twice the number of cells before heating compression. The resultant deformation is non-restorable.

It is also possible to subject the surface of the elastic layer 3 for the paper feed roller in addition to the depression 4$_0$, to permanent compressional deformation depending upon the compressing conditions and further to constitute, on said surface, a thin layer almost free from cells.

The mold material is not specifically limited, but is preferably a metal having a high thermal-conductivity such as aluminium, copper and iron. It is also possible to coat the inside surface thereof with a fluororesin or the like to facilitate the roller to be press fitted therein.

The method for heating compressing is not specifically limited to the above-exemplified method by the use of molds, but may be adopted for use from the publicly known methods. It is possible to cause permanent compressional deformation, for example, by forming protrusions on a flat plate, inserting the base body 1$_0$ for the paper feed roller therebetween, and relatively rotating the base body 1$_0$ so as to be in contact with the flat plate.

As another available method, such a paper feed roller can be produced by winding a spiral band around the base body 1$_0$ for the paper feed roller and heating said band.

The above-mentioned methods are not limited to the production of a paper feed roller, but can be applied to the production of various rollers for other purpose of use.

Subsequently, some description will be given, by way of an example, of the process for producing a developer conveying roller relating to the present invention.

Firstly, FIG. 4 (*a*) illustrates a roller 11, in which a shaft 12 is covered in advance, with an elastic layer 13 on the outer periphery thereof. An adhesive layer may be placed, if necessary, between the shaft 12 and the elastic layer 13 (not shown on the drawing). The exemplary elastic layer 13 which has been made into a roller form in advance, may be replaced, as the case may be, with an elastic layer in the form of a polygon cut out from a foam block.

FIG. 4 (*b*) illustrates the step of press fitting the roller 11 into a cylindrical member 14 the inside diameter of which is smaller than the outside diameter of said roller to compress the elastic layer. In this case, the cylindrical member is not specifically limited, but is exemplified by a pipe made of a metal and/or a resin, preferably a metal having a high thermal-conductivity such as alluminum, copper and iron, because as described hereinafter, the elastic layer is thermally compressed by the shaft 12 and the cylindrical member 14 both being heated. It is also possible to coat the inside surface of the cylindrical member 14 with a fluororesin or the like to facilitate the roller to be press fitted therein.

The inside diameter of the cylindrical member 14 is not specifically limited but may be suitably varied by the extent that the inserted elastic layer is to be compressed in view of the hardness, etc. of the objective roller. It is preferable to set the thickness of the compressed elastic layer to about 50 to 95% based on 100% of the original maximum thickness thereof.

The method for press fitting the roller into the cylindrical member is not specifically limited, but may be adopted from publicly known methods.

FIG. 4 (*c*) illustrates the step of heating the outer periphery of the roller 11 in a state that it is press fitted into the cylindrical member 14 in FIG. 4 (*b*). The method for heating is not specifically limited, but may be adopted from publicly known methods.

The heating temperature is not specifically limited, but may be suitably varied according to the material of construction for the foam to be used. It is preferably in the range of 150 to 250° C. in the case of polyurethane foam.

FIG. 4 (*d*) illustrates the final step of taking out the roller 11' from the cylindrical member 14 after the completion of heating in FIG. 4 (*c*).

In the following, an explanation will be given of the roller 11' which is obtained through the series of the foregoing steps.

Figure 5:
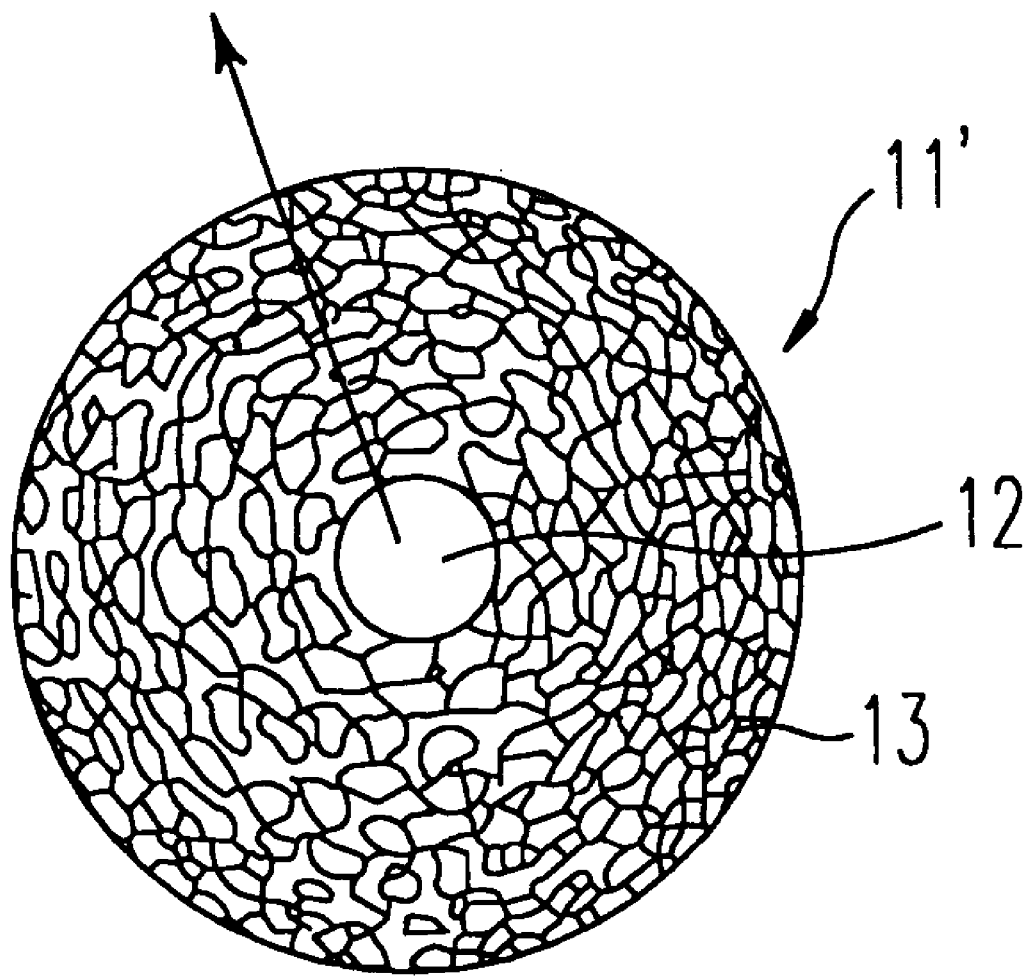
FIG. 5 is a schematic cross-sectional view showing one example of paper feed roller according to the present invention.

FIG. 5 is a cross-sectional view taken on line A—A of FIG. 4 (*d*), and points out that the cells in the foam is in the form of being compressed in the radial direction of the roller, and also that the cells on and around the surface of the elastic layer outnumber the cells inside said layer. The radial direction as mentioned herein is the direction indicated by the arrow in FIG. 5.

The characteristics of the resultant roller 11' are as follows:

Hardness (Ascar C scale); 10 to 70 deg.

Number of cells; number of cells on and around the surface of the elastic layer being 1.05 to 3.00 times the number of cells inside said layer.

In the following, the above-mentioned developer conveying roller will be described in more detail with reference to a working example.

EXAMPLE

There was prepared a roller having a shaft with a length of 250 mm and a diameter of 6 mm, the outer periphery of which was covered with an elastic layer having a length of 210 mm, a thicknes of 6 mm, made of polyurethane foam of an ester-based polyol with a hardness of 15 deg. on Ascar C scale and 50 numbers of cells/inch.

The resultant roller was press fitted into the hollow part of a pipe made of aluminum with a length of 250 mm and an inside diameter of 15.5 mm, heated at 185° C. for 30 minutes by means of a heating furnace and allowed to cool at room temperature to afford a roller having an outside diameter of 15 mm. The heat treated roller thus obtained had an Ascar C scale hardness of 16 deg., the number of cells on and around the surface of 150/inch and the number of cells inside the elastic layer of 60/inch.

Subsequently in order to evaluate the performance of the roller as a developer conveying roller, an evaluation was made of the roller by incorporating it in an image forming apparatus as a commercial machine for the production of 2000 numbers of printed sheets in a developing apparatus. As a result, it was confirmed that the developing apparatus was free from any undesirable foreign matter such as foam even after 2000 numbers of production, and also that the apparatus had surely been fed with a sufficient amount of the developer conveyed through the roller.

The roller having the specific constitution as described hereinbefore and the process for prodcuing the same according to the present invention, facilitate the production of the roller in an economically advantageous manner as compared with conventional rollers. Needless to say, the roller according to the present invention is applicable not only to a paper feed roller but also to a wide variety of rollers.

Owing to the specific shape of the cells being compressed in the radial direction of the roller, smoothness and low hardness are maintained all over the elastic layer of the roller. Also, by virtue of the specific configuration of the cells in which the cells on and around the surface of the elastic layer outnumber the cells inside said layer, the surface thereof is prevented from being clogged with the developer.

What is claimed is:

1. A process for producing a roller for an electrographic apparatus or an electrostatic recording apparatus having an elastic layer comprising a foam, wherein at least a part of said elastic layer is subjected to permanent compressional deformation by heating compression which is effected by pressing a heated mold against the roller equipped with an elastic layer or by pressing a mold against the roller equipped with an elastic layer, followed by heating said mold, said elastic layer being subjected to the permanent compressional deformation by heating compression having a hardness of about 10 to 70 deg. on Ascar C scale, and having a number of cells from a surface of the elastic layer to a depth of 1 mm therefrom being about 1.50 to 3.00 times the number of cells in a depth of over 1 mm from the surface.

2. A process for producing a roller for an electrographic apparatus or an electrostatic recording apparatus having an elastic layer comprising a foam, wherein at east a part of said elastic layer is subjected to permanent compressional deformation by heating compression which is effected by press fitting a roller equipped with an elastic layer into a cylindrical member, compressing at least a part of said elastic layer and subsequently heating said cylindrical member, said elastic layer being subjected to the permanent compressional deformation by heating compression having a hardness of about 10 to 70 deg. on Ascar C scale, and having a number of cells from a surface of the elastic layer to a depth of 1 mm therefrom being about 1.50 to 3.00 times the number of cells in a depth of over 1 mm from the surface.

3. The process for producing a roller according to claim 2, wherein the heating compression is effected so as to melt the surface of the elastic layer to form a skin.

4. The process for producing a roller according to claim 2, wherein the material of construction for the elastic layer is polyurethane foam.

5. The process for producing a roller according to claim 2, wherein said roller is a paper feed roller or developer conveying roller.

6. The process for producing a roller according to claim 2, wherein heating compression is effected so that the cells in the elastic layer are in the form of being compressed in the radial direction of said roller.

* * * * *